Feb. 25, 1941.　　　　　O. STEINER　　　　　2,233,352
PHOTOGRAPHIC CAMERA FRONT STRUCTURE
Filed Dec. 5, 1939　　　　3 Sheets-Sheet 2

INVENTOR.
Oscar Steiner,
BY
ATTORNEY.

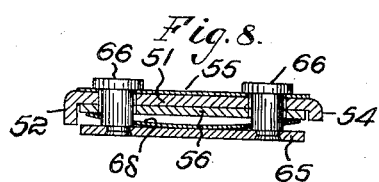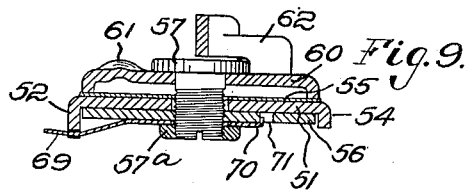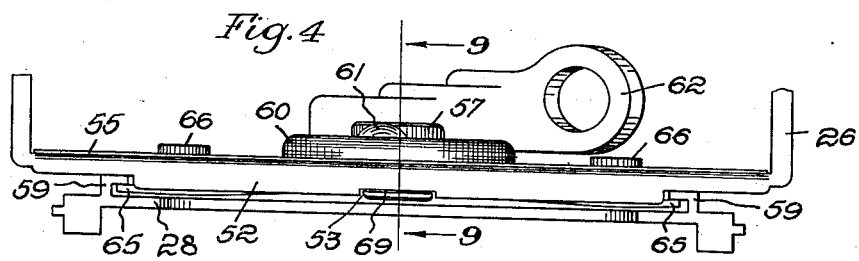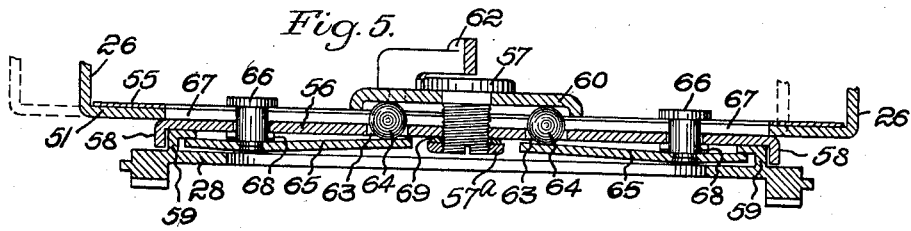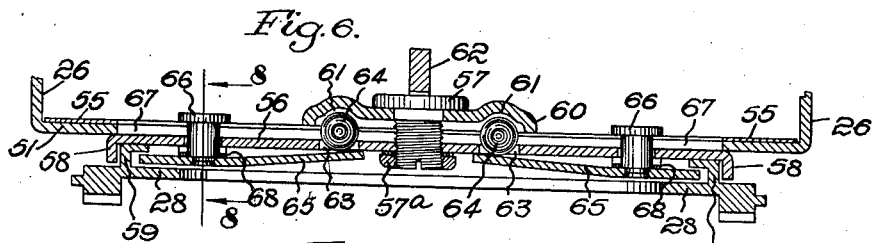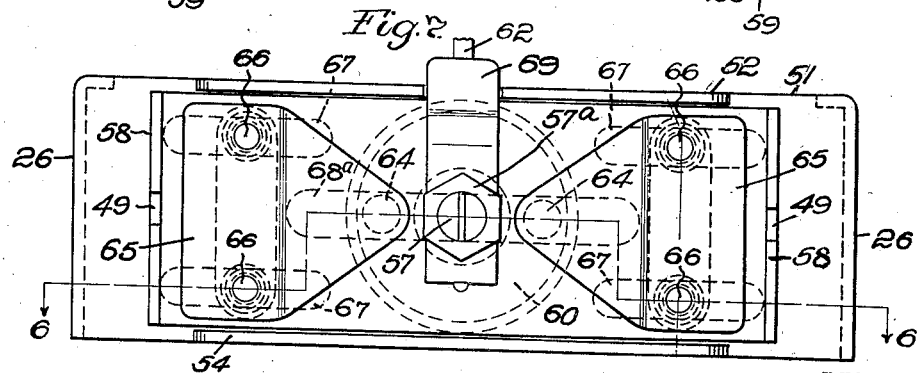

Patented Feb. 25, 1941

2,233,352

UNITED STATES PATENT OFFICE 2,233,352

PHOTOGRAPHIC CAMERA FRONT STRUCTURE

Oscar Steiner, Irondequoit, N. Y., assignor to The Folmer Graflex Corporation, Rochester, N. Y., a corporation of Delaware Application December 5, 1939, Serial No. 307,627

12 Claims. (Cl. 95—51)

This invention relates to new and improved photographic camera front structures.

In order that the principle of the invention may be readily understood, I have disclosed a single embodiment thereof in the accompanying drawings wherein—

Fig. 4 is an enlarged detail of the lower part of Fig. 1, showing particularly the camera-front clamping handle;

Fig. 5 is a transverse vertical section of Fig. 4, showing the camera front in the central position, and also shifted to the left in dotted lines, the camera front being locked to the camera track;

Fig. 6 is a transverse vertical sectional view similar to Fig. 5, on the irregular line 6—6, Fig. 7, excepting that the camera front is shown in an unlocked or unclamped condition on the camera track;

Fig. 7 is a bottom plan view of Fig. 4, particularly showing the clamping shoes;

Fig. 8 is a detail in vertical section taken through Fig. 6 on the line 8—8 thereof; and Fig. 9 is a detail in vertical section taken through Fig. 4 on the line 9—9 thereof.

For the purpose of a disclosure of this invention, I have elected to represent a camera such as disclosed in my co-pending application Ser. No. 309,385, filed December 15, 1939.

However, the camera front of my invention can be used on any camera having a bellows and a track for the front to be moved on.

An important object of this invention is to provide a camera front having means for adjusting the lens in a vertical direction with respect to the center of the photographic plate. Other objects of the invention are to provide a camera having means for adjusting the camera front in a horizontal direction with respect to the photographic plate, to provide means for automatically centering the camera front when moved in a horizontal direction, to provide means for locking the sliding adjustment of the camera front at the same time the camera front is locked to the camera track, and to provide means for retaining the camera front in a central position with respect to the photographic plate when the camera front is released for moving along the camera front.

The structure for obtaining these results will be readily understood from the following description of the preferred embodiment of my invention, to which, however, I am in no wise restricted.

Figure 1:
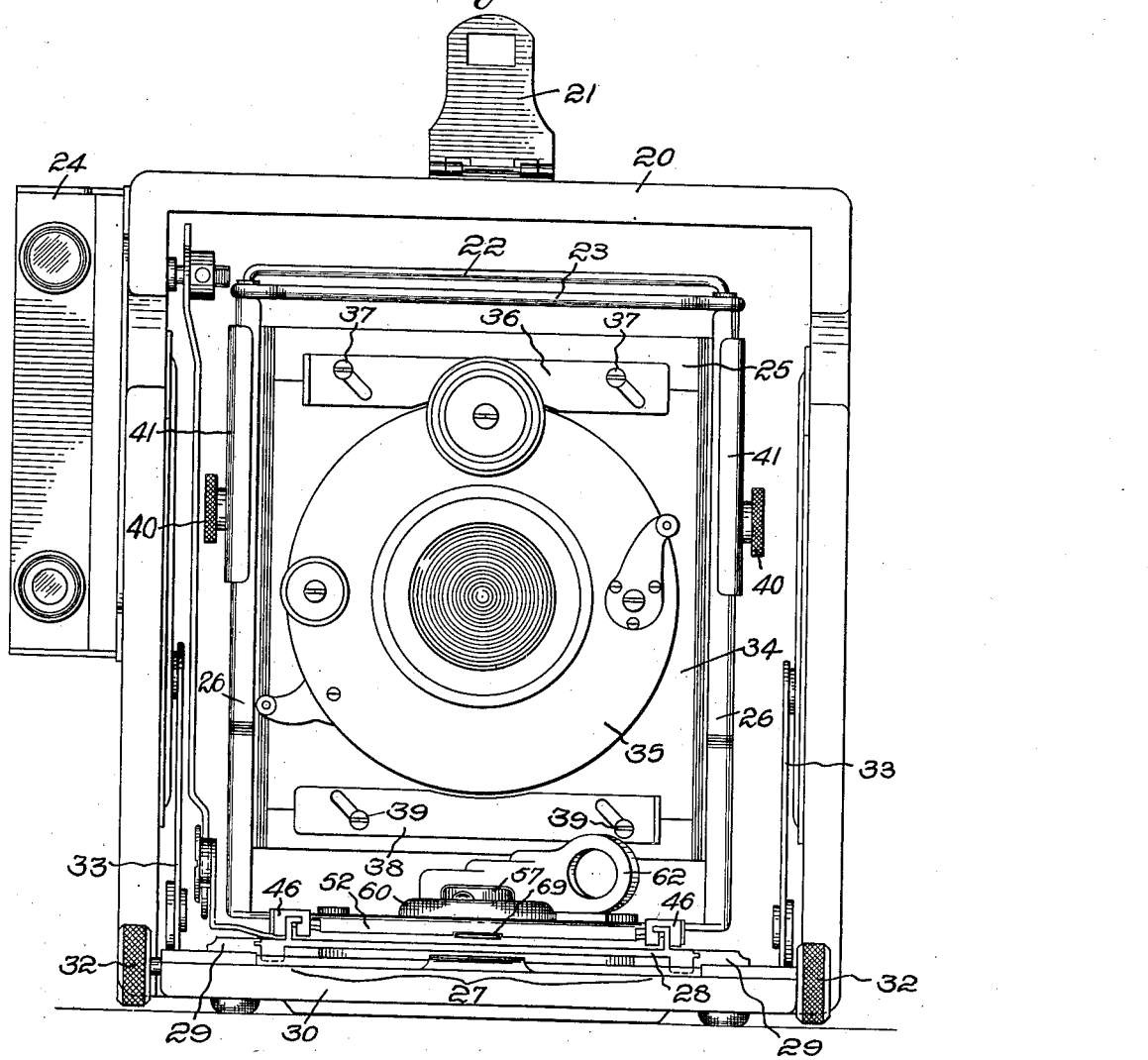
Fig. 1 is a front elevation of the camera front of my invention with the camera lens in the central position both with respect to horizontal and vertical planes.

Referring first to the general construction of the camera, as shown in Fig. 1, the camera box 10 or casing is indicated at 20, the peep sight of the wire frame view finder at 21, the top rail of the wire frame view finder in its depressed position at 22, and the lower rail of the said wire frame view finder at 23. The range finder, 15 which may be of any suitable construction, is shown at 24, but has in itself nothing to do with the present invention. The camera front bellows frame is shown at 25, and the guide rails for the said frame are represented at 26, 26. The entire 20 camera front frame or assembly is denoted generally at 27, and the camera tracks, constituting lengthwise extending opposite parts of a single metal structure, as best appears from Fig. 2, at 28. The camera track guide rails are indicated at 29, 29. They are attached to the camera front foundation or bed 30 by means of screws 31, 31, most clearly shown in Fig. 2. The focusing knobs are shown at 32, 32, and the camera side braces at 33, 33, they being desirably but not necessarily of the type disclosed in my said co-pending application Ser. No. 309,385. The said camera front bellows frame 25 is made to receive a lens board 34 on which is mounted the usual lens and shutter 35. The said lens board 34 is held in place on the front bellows frame 25 by an upper slide lock 36, which is held to the said frame 25 by means of screws 37, 37, and by a lower slide lock 38, which is held to the said camera front bellows frame 25 by means of screws 39, 39. The said camera front bellows frame 25 is held to the said guide rails 26 by means of clamping nuts 40, 40. The said guide rails 26, 26 are each provided with a slot (not shown) and the said camera front bellows frame 25 is provided with a stud which passes through a suitable slot in the said guide rails 26 in order to allow the camera front bellows frame 25 to be moved up or down and clamped into any position, thus providing means for the vertical rise and fall of the said camera front bellows frame 25.

The view finder plates 41, 41 are each provided with a hole through which a stud attached to the camera front frame or assembly passes, thus causing said view finder plates 41, 41 to travel with the said assembly, among the parts whereof are the camera front bellows frame 25. Thus the view finder made up of the parts 22, 23 will always travel with the camera front frame or assembly as an entirety so as to be correctly positioned for the new position of the camera lens, when the camera front bellows frame 25 is shifted either up or down along the camera front rails 26.

The structure thus far described is the same as that in my said co-pending application Ser. No. 17,204.

A view finder of the type shown in this application is necessary when using the sliding front means herein disclosed, in order that the image photographed will be equally aligned or positioned on the photographic plate.

Figure 2:
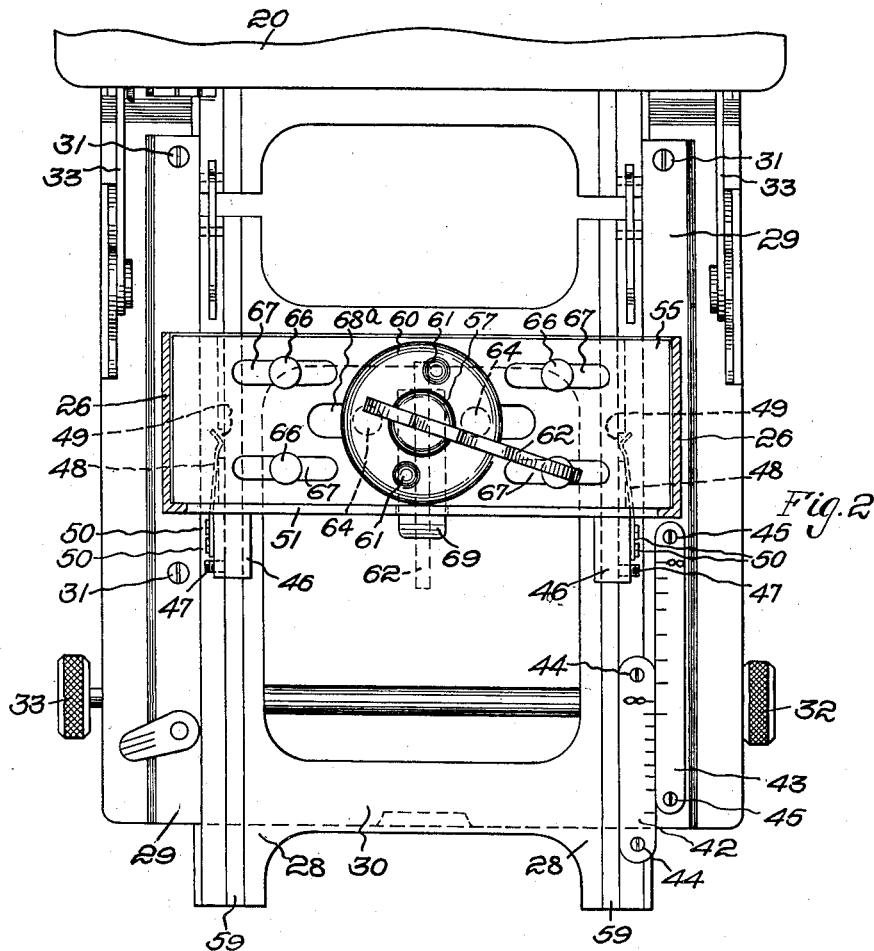
Fig. 2 is a top plan view of the camera bed with the camera front partly in section, and the camera bed open, to show the structure of the track guide rails and the infinity stops.

Referring now more particularly to Fig. 2, one of the camera track rails 29 is there shown as provided with a focusing scale 42 and an index or vernier scale 43. The said focusing scale 42 is held to the camera track structure by means of screws 45, 45. The said camera tracks 28 are also provided with infinity stops 46, 46, held to the said tracks 28 by clamp screws 47, 47. The said infinity stops 46, 46 are provided with short springs 48, 48, each of which engages a notch 49 of the camera front guide member, as indicated in dotted lines in Fig. 2. The said springs 48 are held to the infinity stops 46 by means of screws 50, 50. The infinity stops 46, 46 are placed on the tracks 28 in the position that would be the correct position for infinity for the camera objective lens 35 when the track structure is moved all the way back and the infinity position of the focusing scale and the index or vernier scale 43 coincide. The purpose of the springs 48, 48 is to hold the camera front frame or assembly 27 in position when the said frame or assembly is in the unlocked position on the camera track structure. However, a slight pressure will allow the camera front frame or assembly 27 to be released from the springs 48, 48 for the purpose of moving the said camera front frame or assembly 27 to such position in the camera box or casing that the camera bed or foundation 30, which also constitutes a door, can be closed.

The construction thus far disclosed is mainly not claimed herein.

Referring now to the figures more particularly concerned with the present invention, and which is shown in detail in Figs. 3 to 9 of the drawings, the camera front frame or assembly 27 is desirably made up of a metal stamping having a base member or bed plate 51 and the previously referred to front frame guide rails 26. The said base member or bed plate 51 has its front edge or portion turned down forming an apron 52, shown in front elevation in Fig. 4, and in section in Figs. 8 and 9. As shown best in Figs. 3 and 4, the said apron is provided with a notch 53. The rear portion of the said base member or bed plate 51 is also turned down, forming a guide 54. Overlying the said base member or bed plate 51 is an escutcheon plate 55. The said base member or bed plate 51 is attached to a guide plate 56, shown in the several figures, by means of a shoulder screw 57 threaded into the said guide plate 56 and locked thereon by means of a lock nut 57a. The said guide plate 56 is provided with turned down ends 58, 58 serving to guide the camera front frame or assembly 27 along the camera track rails 59, 59, which upstand from the camera track structure, as best shown in Figs. 5 and 6. Underlying the head of the said shoulder screw 57 is a member 60 of flattened cup-shape, having two indentations 61, shown in Fig. 6. Attached to the said cup-shaped member 60 is a clamping handle 62 preferably formed and operating as a lever. The said guide plate 56 is provided with two holes 63, 63, in which are received the two ball bearings 64, 64. Underlying the said ball bearings 64, 64 are two clamping shoes 65, 65 held to the camera front or assembly 27 by large head rivets 66, 66 which pass through suitable holes in the guide plate 56 and are riveted to the said clamping shoes 65, 65 separated from the guide rails 59, 59, when the said clamping handle 62 is released. Above each clamping shoe 65 is positioned a small, elongated, plate spring 68 each having two holes to receive the two rivets 66, 66. There is also provided a single slot 68 for the shoulder screw 57 and the ball bearings 64, 64.

Figure 3:
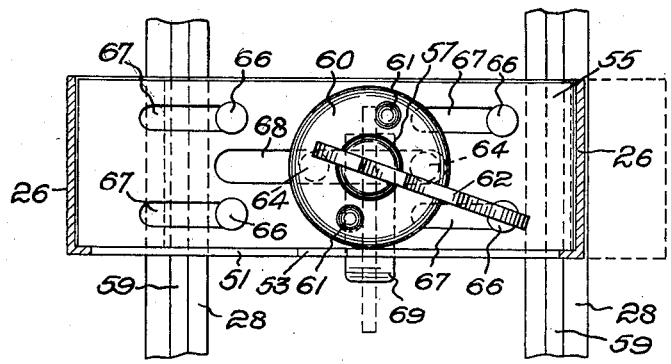
Fig. 3 is an enlarged detail of Fig. 2, partly in section and showing the camera front shifted to the left.

The said clamping handle or lever 62 is shown in Fig. 6 as in a straight outward position, thus allowing the ball bearings 64, 64 to be thrust up into the two identations 61, 61 of the cup-shaped member 60, thus allowing the clamping shoes 65, 65 to be released from clamping contact with the camera track rails 59, 59. This allows free movement of the camera front frame or assembly 27 along the said track rails 59, 59. When the said clamping handle 62 is thrust either to the right as shown in Figs. 2, 3, 4 or to the left of the central position, the said ball bearings 64, 64 are forced out of the said indentations 61, 61 of the cup-shaped member 60, thus thrusting or moving the inner ends of the clamping shoes 65, 65 downward on the shoulder rivets 66, 66, as the pivots for said shoes. This movement brings the outer ends of the said clamping shoes 65, 65 upward into clamping contact with the rails 59, 59, and effects the rigid clamping of the front frame or assembly 27 to the said camera track 28. The base member or bed plate 51 can be moved either to the right or to the left when the said clamping handle 62 is in the released position shown in Fig. 6. In Fig. 5, the said base member or bed plate 51 is shown in dotted lines to have been moved to the left hand position. It can also be moved a similar distance to the right. When the clamping handle or lever 62 is thrust either to the left or to the right as shown in Fig. 5, the base member or bed plate 51, the guide plate 56, the clamping shoes 65, 65 and the rails 59, 59 are all clamped together, so that no relative motion can take place, thus providing means for clamping the camera front frame or assembly 27 in position on the rails 59, and at the same time providing means for clamping the said camera front frame or assembly 27 when shifted either to the right or left, or when it is in the central position. Obviously the base member or bed plate 51 is clamped to the guide plate 56 by reason of the downward movement of the rivets 66 when the handle 62 is turned, this action forcing the heads of said rivets against the escutcheon plate 55, or against the member or plate 51 of the escutcheon plate 55 is omitted.

To provide means for instantly locating the camera front frame or assembly 27 in a central position, I have provided a spring 69, best shown in Fig. 9, as attached to the guide plate 56 by means of the nut 57a on the screw 57. The notch 53 in the apron 52 of the bed plate 51 is engaged by the said spring 69 when the front frame or assembly 27 is in the central position. The purpose of this construction arises out of the fact that it is not always desirable to shift the front of the camera frame or assembly 27 each time that the camera front frame or assembly 27 is moved along the rails 59. Inasmuch as when the clamping handle 62 is in the released position, the camera front frame or assembly 27 would be allowed to shift from side to side, I have provided the described means to hold the said camera front frame or assembly 27 in central position. However, if it is desired to shift the camera front frame or assembly 27 either to the right or the left, this is done by placing downward pressure on the said spring 69 while the camera clamping handle 62 is in the released position shown in Fig. 6, until the correct position for the said frame or assembly 27 is found. The whole assembly 27 can be locked by means of the said clamping handle 62.

In order to restore the camera front frame or assembly 27 to the central position again, it is only necessary to move the clamping handle 62 to the position shown in Fig. 6 and to shift the said front frame or assembly 27 either to the right or the left until the slot 53 is engaged by the spring 69, as shown in Fig. 9. The said spring 69 is prevented from being struck sidewise by reason of the fact that it has at its inner end a lip 70 extending upwardly into a hole 71 in the guide plate 56.

The camera front structure herein disclosed is of a very rigid character, and is such that all wear in the various slidable members is automatically compensated for, thus assuring a camera front structure that will not wabble after short use as is frequently the case with other camera structures. This fact is of very great importance because any movement of the camera front structure has a direct bearing on the quality of the photograph that can be made by the camera.

While the camera front frame or assembly is described as shiftable or adjustable to the right or to the left, or as movable laterally, as well as up and down, so far as the camera front bellows frame thereof is concerned, it is to be understood that these terms are entirely relative, and in the foregoing description it has been assumed that the camera track 28 is positioned horizontally. This, of course, is the usual or preferred construction or arrangement. Nevertheless, within the scope of my invention, the parts of the camera may be so mounted or arranged that the camera track occupies an upright or substantially upright position, in which case parts herein shown as occupying a position parallel thereto would be upright. That is to say, the guide plate 56 is shown in Figs. 5 and 6 as horizontal and the base member 51 as slidable in a horizontal plane thereacross. In any case, the base member 51 is slidable in a plane parallel, or substantially so, with the guide plate 56, whatever the position of the latter may be. The escutcheon plate 55 is employed for the usual purposes of an escutcheon, namely, as a shield or cover, and it may or may not be employed in the present construction. It is to be understood that the clamping handle 62 and the cup-shaped member 60 are attached together or are integral so that they move as one piece. When the said clamping handle is in the position shown in Fig. 5, the two indentations 61 are positioned at right angles to the position shown in Fig. 6, and hence cannot receive the ball bearings 64, 64.

So far as I am aware, I am the first to provide in a device that is thoroughly effective and is rigid and firm in all positions of adjustment, a base member for the camera front that is shiftable transversely to the guide plate whereon or against which the same is supported, and obviously means other than those shown may be employed to permit the transverse shifting and the locking, clamping or securing of the base member and guide plate in their several relative positions.

Having thus described one illustrative embodiment of the invention, it is to be understood that although specific terms are employed, they are used in a generic and descriptive sense and not for purposes of limitation, the scope of the invention being set forth in the following claims.

I claim:

1. A photographic camera front structure comprising in combination, a camera track structure and a guide plate for the camera front movable in a lengthwise direction along the said camera track structure preparatory to the photographing operation, a base member 51 received upon the guide plate and shiftable transversely with respect to said guide plate, and means including a rivet-like member 66 carried by said base member and extending to the guide plate, and a clamping plate 65 attached to said rivet-like member and having clamping movement relative to said rivet-like member, for temporarily confining the base member and guide plate together, with means to act upon said clamping plate and move it into clamping relation with said camera track to bind the latter against said guide plate.

2. A photographic camera front structure comprising in combination, a camera track structure having rails 59, a guide plate 56 received upon the said rails for movement thereon, a base member 51 of a camera front assembly received upon the said guide plate and capable of a transverse movement thereacross, oppositely positioned clamping plates or shoes carried by said base member and directly engageable with said rails 59, and means readily accessible to the operator to move said clamping plates or shoes upon their support into and out of clamping relation with said rails to bind said rails and guide plate temporarily together.

3. In a photographic camera front structure, a camera track structure having rails 59, a guide plate 56 received upon said rails, a base member 51 of a camera front assembly received upon said guide plate and having a transversely extending slot, permitting transverse movement of said base member, rivet-like elements 66 received in said slot, clamping shoes 65 mounted upon said elements 66 respectively and having portions to engage the under side of said rails, and operating means 60, 62 for moving said clamping shoes into holding engagement at said portions with said rails 59.

4. In a photographic camera front structure, a camera track structure having rails 59, a guide plate 56 received upon said rails, a base member 51 of a camera front assembly received upon said guide plate and having a transversely extending slot, permitting transverse movement of said base member, rivet-like elements 66 received in said slot, clamping shoes 65 mounted upon said elements 66 respectively and having portions to engage the under side of said rails, operating means 60, 62 for moving said clamping shoes into holding engagement at said portions with said rails 59, and means whereby said base member may be held in central position with respect to the guide plate when said two parts are in unclamped position with respect to each other.

5. In a photographic camera front structure, a camera track structure having rails 59, a guide plate 56 received upon said rails, a base member 51 of a camera front assembly received upon said guide plate and having a transversely extending slot, permitting transverse movement of said base member, rivet-like elements 66 received in said slot, clamping shoes 65 mounted upon said elements 66 respectively and having portions to engage the under side of said rails, operating means 60, 62 for moving said clamping shoes into holding engagement at said portions with said rails 59, and means whereby said base member may be held in central position with respect to the guide plate when said two parts are in unclamped position with respect to each other, said structure having a camera front bellows frame adjustable up and down.

6. In a photographic camera front structure, a camera track structure having rails 59, a guide plate 56 received upon said rails, a base member 51 of a camera front assembly received upon said guide plate and having a transversely extending slot, permitting transverse movement of said base member, rivet-like elements 66 received in said slot, clamping shoes 65 mounted upon said elements 66 respectively and having portions to engage the under side of said rails, operating means 60, 62 for moving said clamping shoes into holding engagement at said portions with said rails 59, means whereby said base member may be held in central position with respect to the guide plate when said two parts are in unclamped position with respect to each other, said structure having a camera front bellows frame adjustable up and down, and a view finder 22, 23 movable with the camera front bellows frame in all adjustments of said bellows frame.

7. In a photographic camera front structure, a camera track structure having rails 59, a guide plate 56 received upon said rails, a base member 51 of a camera front assembly received upon said guide plate and having a transversely extending slot, permitting transverse movement of said base member, rivet-like elements 66 received in said slot, clamping shoes 65 mounted upon said elements 66, respectively and having portions to engage the under side of said rails and operating means 60, 62 for moving said clamping shoes into holding engagement at said portions with said rails 59, a camera front bellows frame constituting a part of said structure and movable up and down thereon, and view finder means carried on said bellows frame and movable therewith in the adjusting movement of said bellows frame.

8. In a photographic camera front structure or assembly, a camera track having opposite edge rails, a guide plate received upon said rails, a base member of said front structure or assembly received upon said guide plate and having a transversely extending slotted formation permitting transverse movement of said base member, a pair of clamping members, one for each of said rails and adapted respectively to engage, by the outer ends of said clamping members, the rails directly, supports for said clamping members carried by said base member and extending through said slotted formation of said base member and also through the said guide plate, and means adapted to engage the inner ends of said clamping members to force the outer ends of said clamping members into clamping engagement with said rails, against said guide plate.

9. In a photographic camera front structure or assembly, a camera track having opposite edge rails, a guide plate received upon said rails, a base member of said front structure or assembly received upon said guide plate and having a transversely extending slotted formation permitting transverse movement of said base member, a pair of clamping members, one for each of said rails and adapted respectively to engage, by the outer ends of said clamping members, the rails directly, supports for said clamping members carried by said base member and extending through said slotted formation of said base member and also extending through the guide plate, and a centrally positioned, operating means readily accessible to the operator to engage directly the inner ends of said clamping members to force the outer ends of said clamping members into direct clamping engagement with said rails, against said guide plate.

10. In a photographic camera front structure or assembly, a camera track having opposite edge rails, a guide plate received upon said rails, a base member of said front structure or assembly received upon said guide plate and having a transversely extending slotted formation permitting transverse movement of said base member, a pair of clamping members one for each of said rails and adapted respectively to engage, by the outer ends of said clamping members, the rails directly, supports for said clamping members carried by said base member and extending through said slotted formation of said base member and also extending through the guide plate, and means consisting of a recessed, cup-shaped member and elements 64, 64, to engage directly the inner ends of said clamping members to force the outer ends of said clamping members into direct clamping engagement with said rails, against said guide plate.

11. A combination according to claim 8, but in which the clamping members are plate-like shoes 65, 65, and the supports for said clamping members are rivets 66, 66 secured to said clamping members and having heads received upon the upper face of said base member.

12. A combination according to claim 1, but in which the camera track structure is provided with edge rails 59 and the said clamping movement of the clamping plate 65 clamps the base member 51 against the guide plate and also clamps said guide plate and said edge rails 59.

OSCAR STEINER.